Patented Aug. 24, 1943

2,327,594

UNITED STATES PATENT OFFICE 2,327,594

PRINTING INK

Donald Robert Erickson and Paul J. Thoma, Kalamazoo, Mich.

No Drawing. Application August 11, 1941, Serial No. 406,398

2 Claims. (Cl. 106—30)

This invention relates to improvements in printing ink.

This invention relates to printing inks and pigments suitable therefor. It relates particularly to improved tungstated pigments and to printing inks using these pigments and a varnish comprising a liquid polyglycol and a resin consisting of either rosin or a terpene hydrocarbon of the formula $C_{10}H_{16}$ modified by an alpha beta unsaturated organic polybasic acid such as maleic or fumaric. Such ink has water tolerance so that it will not set up on the press, but after it has been printed the printed film may be treated with water to form on the surface thereof a hard non-offsetting surface.

The objects of this invention are:

First, to provide a new and improved tungstated pigment.

Second, to provide such a pigment which may be used in an ink and which will give a workable body.

Third, to provide a new and improved ink of the class described using a tungstated pigment which ink is workable and does not harden during storage, as is the case with unimproved tungstated pigments.

Fourth, to provide such an ink with an improved body.

Fifth, to provide such an ink which may be treated with water as aforesaid to eliminate offsetting.

Other objects and advantages pertaining to details and economies will appear from the description to follow.

In carrying out the invention, the pigment is resinated with a resin comprising either a rosin or a terpene hydrocarbon of the formula $C_{10}H_{16}$, such as alpha terpinene, modified with an alpha beta unsaturated organic polybasic acid such as maleic or fumaric. The modified rosin may be obtained commercially under the trade name "Teglac 127." The modified terpene hydrocarbon may be obtained commercially under the trade name "Petrex Acid."

The resination of the pigment is done in the pulp state in substantially the same way as pigments are resinated with rosin. The pigment in the pulp state is thoroughly mixed with the sodium soap of the resin or an alcohol solution of the resin. Up to equal parts by weight on a dry basis of the resin and the pigment are used. The resin is then precipitated and the resinated pigment dried and ground.

The dried and ground pigment is then incorporated in the usual way in a varnish consisting of 50 parts by weight of a liquid polyglycol such as diethylene glycol and 50 parts by weight of either the modified rosin or the modified terpene hydrocarbon aforesaid. A mixture of the aforesaid modified rosin and modified terpene hydrocarbon may be employed either in the ink or in the resination of the pigment.

Typical pigments which may be treated are tungstated malachite green, methyl violet, auramine, Victoria blue, rhodamine and brilliant blue. Other tungstated pigments may be employed.

The improved pigment is of a very clear and clean color. The ink in which it is used does not tend to harden. The addition of the pigment to the liquid polyglycol modified rosin or terpene hydrocarbon varnish does not reduce the water tolerance thereof, as would be the case if tungstated pigments resinated with rosin were employed. The ink is suitable for use in the aforesaid process in which water is used to prevent offsetting.

The terms and expressions which have been herein employed are used as terms of description and not of limitation, and there is no intention, in the use of such terms and expressions, of excluding any equivalents of the features shown and described. It is recognized that various modifications are possible within the scope of the invention claimed.

Having thus described our invention, what we claim as new and desire to secure by Letters Patent is:

1. A non-offsetting printing ink having a high water tolerance comprising a varnish comprising a liquid polyglycol as a solvent for the resin, and a resin selected from the group consisting of rosin modified with an alpha beta unsaturated organic polybasic acid and a terpene hydrocarbon of the formula $C_{10}H_{16}$ modified by an alpha beta unsaturated organic polybasic acid and in sufficient amount to form, when subjected to steam immediately after printing, a thin hard film of resin over the exposed surfaces of the printed film, and a pigment comprising a tungstated pigment selected from the group consisting of malachite green, methyl violet, auramine, Victoria blue, rhodamine and brilliant blue resinated with an equal amount by weight of a resin selected from the group consisting of rosin modified with an alpha beta unsaturated organic polybasic acid and a terpene hydrocarbon of the formula $C_{10}H_{16}$ modified by an alpha beta unsaturated organic polybasic acid whereby said water tolerance is maintained, printing characteristics are improved, and spoilage on storage is prevented.

2. A non-offsetting printing ink having a high water tolerance comprising a varnish comprising a liquid polyglycol as a solvent for the resin, and a resin selected from the group consisting of rosin modified with an alpha beta unsaturated organic polybasic acid and a terpene hydrocarbon of the formula $C_{10}H_{16}$ modified by an alpha beta unsaturated organic polybasic acid and in sufficient amount to form, when subjected to steam immediately after printing, a thin hard film of resin over the exposed surfaces of the printed film, and a pigment comprising a tungstated pigment selected from the group consisting of malachite green, methyl violet, auramine, Victoria blue, rhodamine and brilliant blue resinated with a resin selected from the group consisting of rosin modified with an alpha beta unsaturated organic polybasic acid and a terpene hydrocarbon of the formula $C_{10}H_{16}$ modified by an alpha beta unsaturated organic polybasic acid whereby said water tolerance is maintained, printing characteristics are improved, and spoilage on storage is prevented.

DONALD ROBERT ERICKSON.
PAUL J. THOMA.